(12) United States Patent
Knepper et al.

(10) Patent No.: US 9,615,010 B2
(45) Date of Patent: Apr. 4, 2017

(54) DISPLAY SYSTEM HAVING IMAGE CAPTURE DEVICE AND ADJUSTABLE VISIBLE LIGHT FILTER

(71) Applicant: Dell Products, LP, Round Rock, TX (US)

(72) Inventors: Lawrence E. Knepper, Leander, TX (US); Deeder M. Aurongzeb, Austin, TX (US); Christopher A. Torres, San Marcos, TX (US); Thomas Lanzoni, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 85 days.

(21) Appl. No.: 14/626,525

(22) Filed: Feb. 19, 2015

(65) Prior Publication Data

US 2016/0248954 A1 Aug. 25, 2016

(51) Int. Cl.
*H04N 5/225* (2006.01)
*H04N 5/243* (2006.01)
*H04N 5/238* (2006.01)
*G06F 1/16* (2006.01)
*G02B 5/20* (2006.01)

(52) U.S. Cl.
CPC ........... *H04N 5/2257* (2013.01); *G02B 5/208* (2013.01); *G06F 1/169* (2013.01); *G06F 1/1686* (2013.01); *H04N 5/238* (2013.01); *H04N 5/243* (2013.01)

(58) Field of Classification Search
CPC ...... H04N 5/2257; H04N 5/243; H04N 5/238; G02B 5/208; G06F 1/1686; G06F 1/169
USPC ........................................................ 348/342
See application file for complete search history.

(56) References Cited

U.S. PATENT DOCUMENTS

| | | | | |
|---|---|---|---|---|
| 4,751,379 A | * | 6/1988 | Sasaki | G06F 3/0421 250/221 |
| 2010/0026645 A1 | * | 2/2010 | Yim | G06F 3/0421 345/173 |
| 2010/0194890 A1 | * | 8/2010 | Weller | B60R 1/12 348/148 |
| 2012/0032925 A1 | * | 2/2012 | Sekiya | G06F 3/03545 345/175 |

* cited by examiner

*Primary Examiner* — Antoinette Spinks
(74) *Attorney, Agent, or Firm* — Prol Intellectual Property Law, PLLC; H. Kenneth Prol

(57) ABSTRACT

A display system having a visible light filter that can be enabled and disabled to preferentially filters visible light over near-field infrared light is disclosed.

20 Claims, 8 Drawing Sheets

DISPLAY SYSTEM HAVING IMAGE CAPTURE DEVICE AND ADJUSTABLE VISIBLE LIGHT FILTER

FIELD OF THE DISCLOSURE

The present disclosure generally relates to displays for information handling systems, and more particularly to displays having an image capture device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. A display of an information handling system may include various features, for example, a display may include a touch sensitive input device (a touch panel), an image capture device (a camera).

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
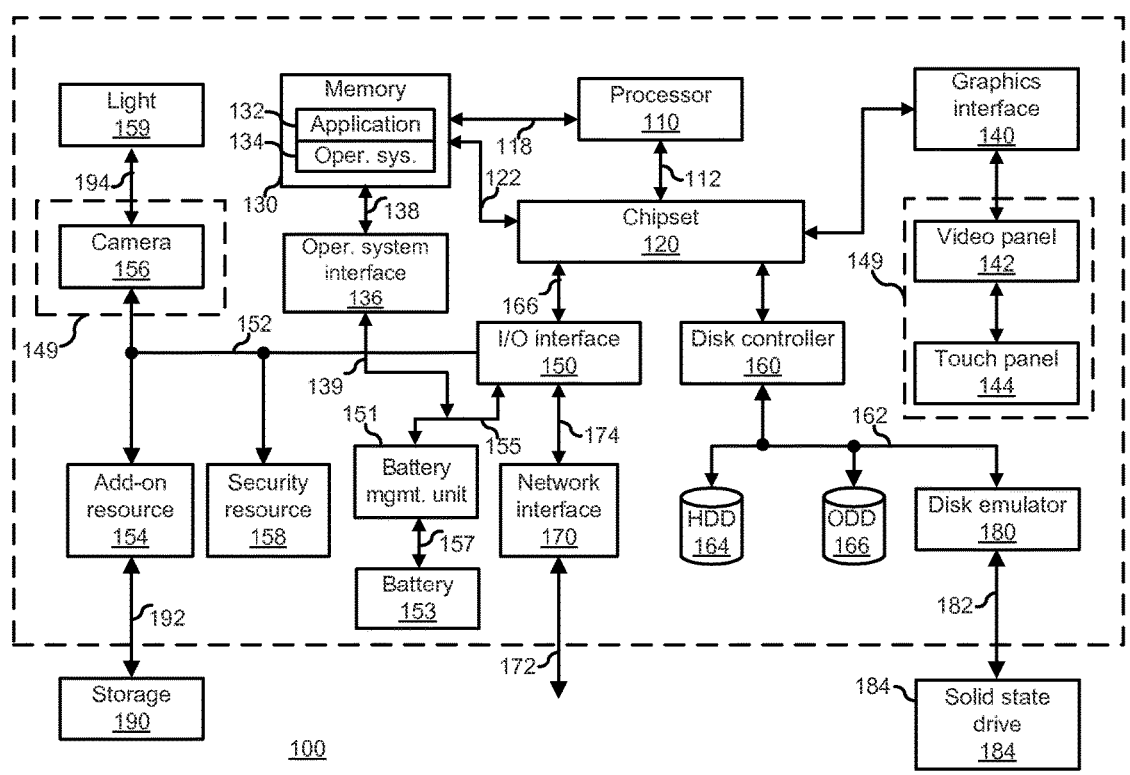
FIG. 1 illustrates particular embodiment of an information handling system.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources, also referred to herein as a data processor, for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices that embody one or more of the devices described above, and operates to perform one or more of the methods described above. Information handling system 100 includes a processor 110, a chipset 120, a memory 130, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Chipset 120 to receive rendered image information. Chipset 120 is connected to display system 149 that includes a video panel 142 and a touch panel 144. The chipset 120 provides rendered image information to the video panel 142 of a display system 149 via graphics interface 149, and receives user input information from touch panel 144.

In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Disk controller 160 and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1394 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to camera 156, and to a security resource 158. Peripheral interface 152 can be the same type of interface as disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof. Camera 156 is connected to light 159 via connection 194. Light 159 can be controlled to provide illumination of objects of which a photograph or video is being recorded using camera 156.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

In accordance with at least one embodiment, a housing defines a display system that includes at least the video panel 142, the touch panel 144, and the camera 156 as described in greater detail with respect to FIGS. 2-10.

Figure 2:
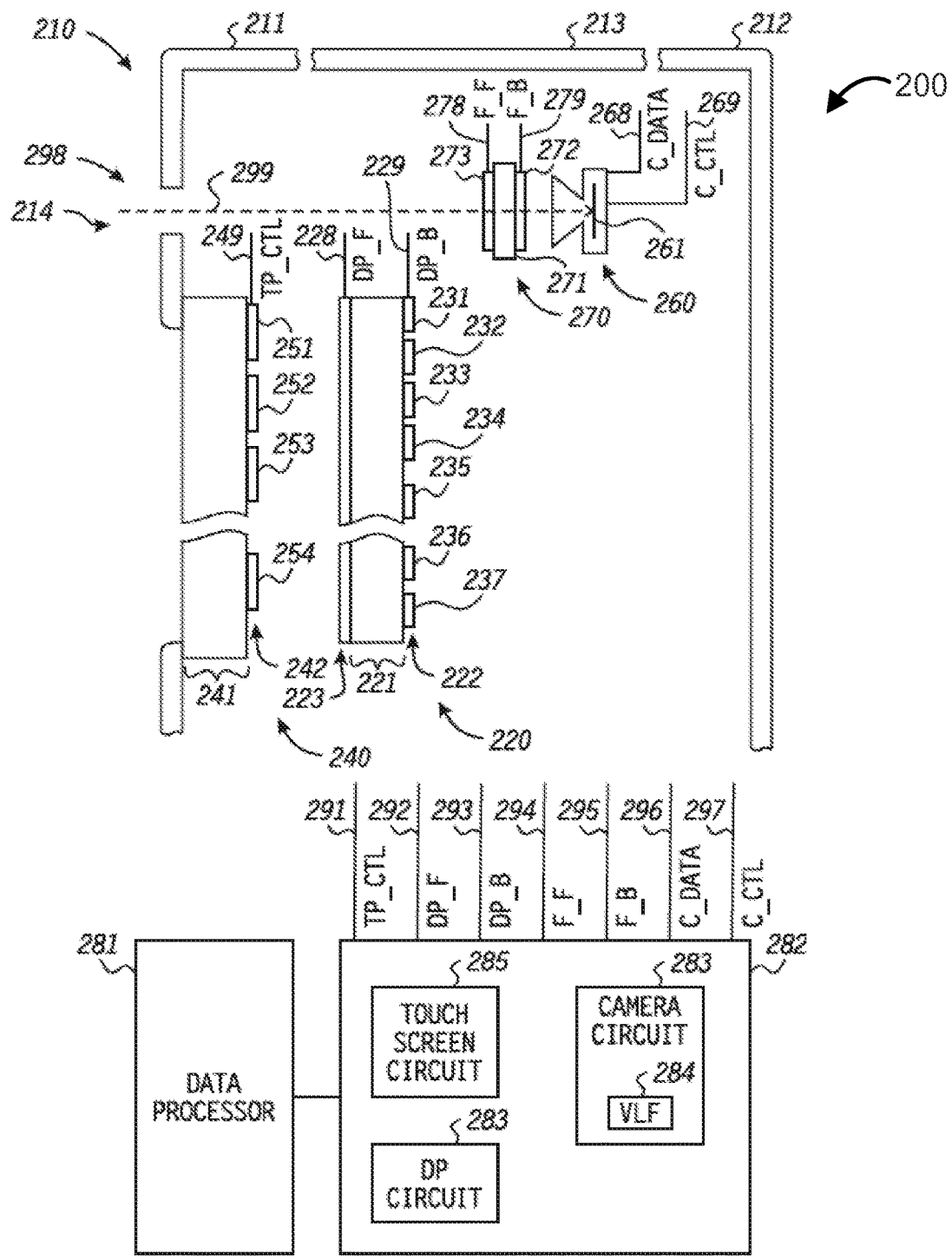
FIG. 2 illustrates a schematic and cross-sectional view of a particular embodiment of an information handling system.

FIG. 2 illustrates, in block diagram form, an information processing system that includes a display control circuitry 282 that is connected to a display system 200 and to a data processor 281. The data processor 281 is presumed to be an instruction based data processor having one or more processing cores. Data processor 281 can provide image information to the display control circuitry 282, which in turn processes the information to provide rendered image information to a display panel 220 of the display system 200. Data processor 281 can also provide information to the display control system 282 indicating whether a visual light filter 270 of the display system 200 is to be enable or disabled, wherein the visual light filter 270 preferentially filters visible light as compared to near-field infrared light as will be discussed in greater detail below. The display system circuit 282 can receive user input information from the display system 200, such as information from touch panel 240, which can be further processed and provided to the data processor 281 for additional handling.

Display system 200 is an integrated assembly comprising a plurality of devices that can be referred to herein as components. The display system 200 is defined by a housing that includes a front frame 211 and a back frame (cover) 212. Note that the housing portion 213 illustrated at FIG. 2 can be part of the front cover 211, part of the back cover 212, or a mid-frame portion. The housing physically supports various components, including a display panel 220, a touch panel 240, a visible light filter 270 and an image capture device 260, also referred to as a camera.

The display system 200 includes a front-most surface that can be defined by a combination of a bezel 214 of the front frame 211 and an exposed portion of touch panel 240. In an embodiment that does not include a touch panel, the front-most surface of the display system 200 can be defined by an exposed portion of touch panel 240. In other embodiments, a protective layer can overlie the touch panel 240, or display panel 220, to define the front-most surface of the display system 200.

The bezel 214 portion of the front frame 211 includes an opening 298 through which light can pass in route to the image sensor 261 of the image capture device 260 along a light transmission path 299 of the display system.

The display system 200 can be a stand-alone display that can be connected and disconnected to other portions of an information processing system, such as to an appropriate input/output (IO) port of a laptop or desktop computer. For example, when display system 200 is a stand-alone display, the display control circuit 282 and data processor 281 of FIG. 2 can reside within the housing of a desktop or laptop computer having an IO port that can be connected to the display system 200. In another embodiment, the display system 200 can be a permanent portion of a specific information handling system. For example, the display system 200 can be the display of a laptop computer that is connected to a base portion of the laptop. It will be appreciated, that the display system 200 can have additional components than those indicated above. For example, the display system 200 can be an all-in-one information handling system such as a tablet device, mobile phone device, all-in-one desktop computer, and the like.

By way of example, it is presumed that the housing of the various display systems described herein is a rigid structure that provides support and protection to the various components housed therein. Thus, the various components of the display system 200 will typically be located in fixed relation to the housing, and to each other. It will be appreciated, that in other embodiments that there may be flexibility associated with the display system 200, such as its housing its various components. The display system 200 further includes a front side opening 298 through which light based upon an image can pass in order to be captured by the camera 260. The front side opening 298 can be through the bezel, as illustrated, or through regions or openings of the touch panel 240 and display panel 220.

By way of example, in the following discussion the display panel 220 is presumed to be a non-flexible liquid crystal display (LCD) that includes a LCD layer 221, a front side conductive layer, 223 and a backside conductive layer 222. The LCD layer 221 includes a liquid crystal region where a liquid crystal material resides (not shown) that resides between a front side transparent support layer and a backside transparent support layer. The front side bias layer 223 includes one or more regions where a transparent conductor resides. The backside bias layer includes one or more regions where a transparent conductor resides. These transparent regions can be referred to as conductive regions or as conductive portions of their respective layer. The transparent conductors can comprise a metal, such as indium tin oxide, a polymer, the like, and combinations thereof.

By way of example, the front side bias layer 223 covers the entire front side of display panel 220 and is connected to an interconnect 228 to receive a signal DP_F that provides a common bias voltage. The backside bias layer of display panel 220 includes a plurality of conductive regions 231-237, which can be referred to as sub-pixel electrodes, that are connected to an interconnect 229 to receive a signal DB_B that is used to provide bias voltages to each one of the sub-pixel regions 231-237. Whether a particular liquid crystal region of the display panel 220 is transparent or opaque is based upon the bias level of its corresponding sub-pixel region.

The term interconnect as used herein refers to a signal communication path over which information is transmitted either directly or indirectly. For example, an interconnect can be implemented as a passive device, such as one or more conductive traces, that transmits information directly through an interconnect, or as an active device, whereby information being transmitted is amplified or buffered, e.g., stored and retrieved such as at a first-in first-out memory or other memory device, and the like in the processes of being communicated between device. As described herein, multiple interconnects can be referred to as making up a larger interconnect that defines a signal communication path between devices. Thus an interconnect connecting the display control circuit 282 to the display panel 220 is understood to include the interconnect 228 at the display panel 200 and the interconnect 292 at the display control circuit 282. For clarity, the term segment, or signal communication path segment, and their variants, can be used to refer to interconnects are one of a plurality of interconnects between two devices being referenced.

The touch sensitive input device 240, also referred to as a touch panel, is a user input device is used to detect a location of the touch panel that is being touched by a user. Operation of the touch panel 240 can be based on a resistive or capacitive technology. By way of example, touch panel 240 is presumed to operate on a capacitive technology. A conductive layer 242 is resides at the back side of a transparent substrate 241 that includes a grid formed using a transparent conductor that includes the conductive regions 251-254, as viewed in cross-section at FIG. 2. The regions 251-254 can be referred to as conductive regions or as conductive portions of conductive layer 242. The transparent conductor can comprise a metal, such as found in indium tin oxide, a polymer, the like, and combinations thereof.

In response to user making physical contact with the front side surface of the touch panel 240 the capacitive grid will experience a localized change in capacitance that can be detected to determine the contact location. By way of example, it is presumed that the touch location is determined by circuitry integrated at the touch panel 240 (not shown) and transmitted as information via a signal TP_CTL along interconnect 249 to the interconnect 291 of the display control circuit 282.

Image capture device 260, also referred to as a camera, can capture still images, moving images, the like, and combinations thereof. Light received at the image sensor 261 travels along an image transmission path 299 of the display system 200 that begins at the opening 298. Camera 260 includes an image sensor 261, such as a charge coupled device that can detect various frequencies of light. The image sensor 261 can detect both visible light, and near-field infrared (NFIR) light, wherein the near-field infrared light includes infrared light having a frequency below a thermal imaging region of infrared light which typically occurs at a wavelength ranging from 780 to 820 nanometers (nm).

The camera 260 is connected to an interconnect 269 to communicate control information (C_CTL) between the camera 260 and an interconnect 297 that is connected to the display control circuit 282. The camera 260 is connected to an interconnect 268 to communicate data information (C_DATA) between the camera 260 and an interconnect 296 that is connected to the display control circuit 282.

The visible light filter (VLF) 270 is a device that can be selectively controlled to change its transmittance value, e.g., to filter different amounts of light that passes through the filter. As illustrated, VLF 270 includes a filtering layer 271, a front side conductive region 273 connected to an interconnect 278, and a back side conductive region 272 connected to an interconnect 279. The transmittance of VLF 270 can be changed by adjusting the voltages of signals F_F and F_B, received at interconnects 278 and 279, to change the voltage differential across the filtering layer 271. The terms "enabled" and "disabled", and their variants, as used with respect to a visual light filter are relative terms, wherein when the VLF is disabled the visible light transmittance of the VLF is greater than when the VLF is enabled.

In addition to being selectively controllable, VLF 270 preferentially filters visible light as compared to near-field infrared (NFIR) light. Thus, a change in VLF 270 operation from an initial operational state to a subsequent operational state will result in a greater absolute change in the visible light transmittance of VLF 270 as compared to NFIR light.

The preferential filtering of visible light by VLF 270 will be better understood with reference to the following example, in which it is assumed that the transmittance of visible light and NFIR light by VLF 270 is the same, e.g., 90%, during an initial state of operation. It is assumed that VLF 270 is subsequently enabled to have a lower transmittance, e.g., filtering is enabled in a subsequent state of operation. During the subsequent state of operation, the transmittance of visible light and NFIR light by VLF is presumed to be 30% and 81%, respectively. Thus, the visible light transmittance is reduced (60 percentage points) at least twice as much as the NFIR light transmittance (9 percentage points).

The change in transmittance can also be calculated as an absolute change in transmittance. Thus, in the above example, the visible light transmittance of VLF 270 is 66% (|90%−30%|/90%), while the absolute change in the NFIR light transmittance is 10% (|90%−81%|/90%). In this example, enabling VLF 270 results in a greater absolute change of visible light transmittance as compared to NFIR light transmittance. As a further example, it is assumed that VLF 270 is subsequently disabled to return the transmittance of VLF 270 back to that of its initial state of operation. In this situation, the absolute change in the visible light transmittance is 200% (|30%−90%|/30%), and the absolute change in the NFIR light transmittance is 11% (|81%−90%|/81%). Thus, disabling VLF 270 also results in a greater absolute change of visible light transmittance as compared to NFIR light transmittance.

In FIG. 2, the interconnect portion of signal communication paths connecting the interconnects 291-297 at the display control circuit 282 to their respective interconnects 249, 228, 229, 278, 279, 268, and 269 at components the display system 200 are not illustrated. However, various implementations of such an interconnect portion are illustrated in the following figures.

Figure 3:
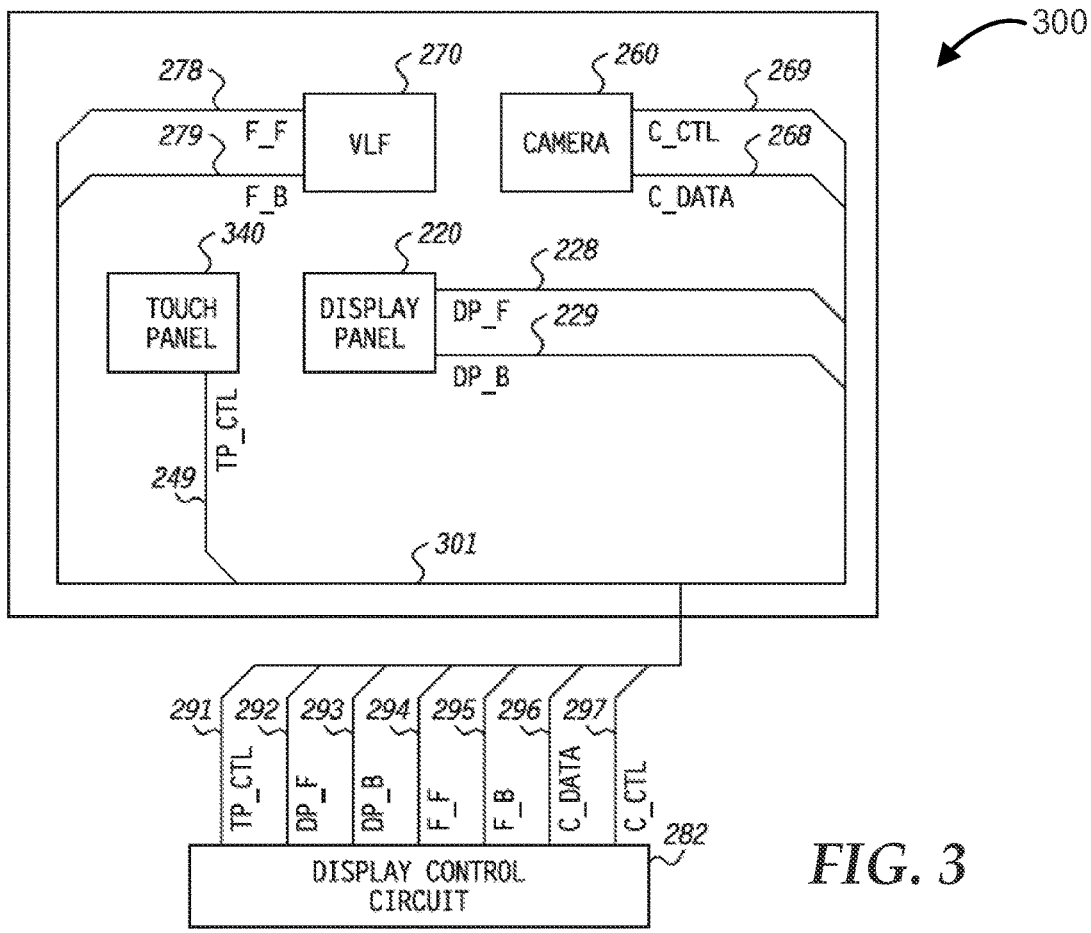
FIG. 3 illustrates a block diagram a particular embodiment of portion of FIG. 2.

FIG. 3 illustrates in schematic form an information processing system that is a particular embodiment of the information processing system of FIG. 2. The information processing system of FIG. 3 includes a display system 300 that is a particular embodiment of the display system 200 of FIG. 2. Features of FIG. 2, including features of the display system 300, having the same reference numbers as features previously described are presumed to be the same. Though it will be appreciated, that these commonly numbered features may actually be different.

Figure 4:
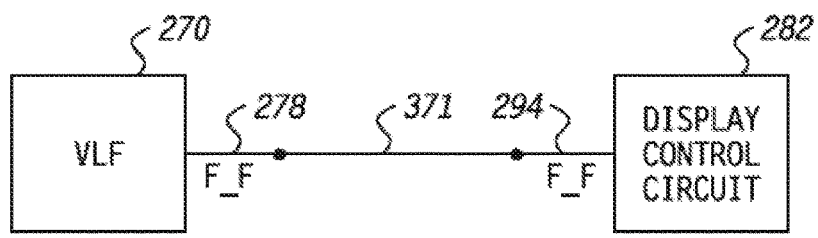
FIG. 4 illustrates a block diagram of a particular embodiment of a portion of FIG. 3 in greater detail.

According to the embodiment of FIG. 3, each of the interconnects 291-297 at display control circuit 282 are connected to their corresponding component of display system 300 with out being routed through either the display panel 220 or the touch panel 340, as will be described below. For example, each signal communication path between the display control circuit 282 and its corresponding component of display system 300 can be a passive interconnect, such as one or more individual wires that can be integrated at a ribbon cable. The interconnect 294 can represent one or more terminals of display control circuit 282 over which signal F_F is transmitted to interconnect 278 of VLF 270 via a ribbon cable. In FIG. 4 the interconnect between display control circuit 282 and VLF 270 includes segments 294, 371 and 278.

Figure 5:
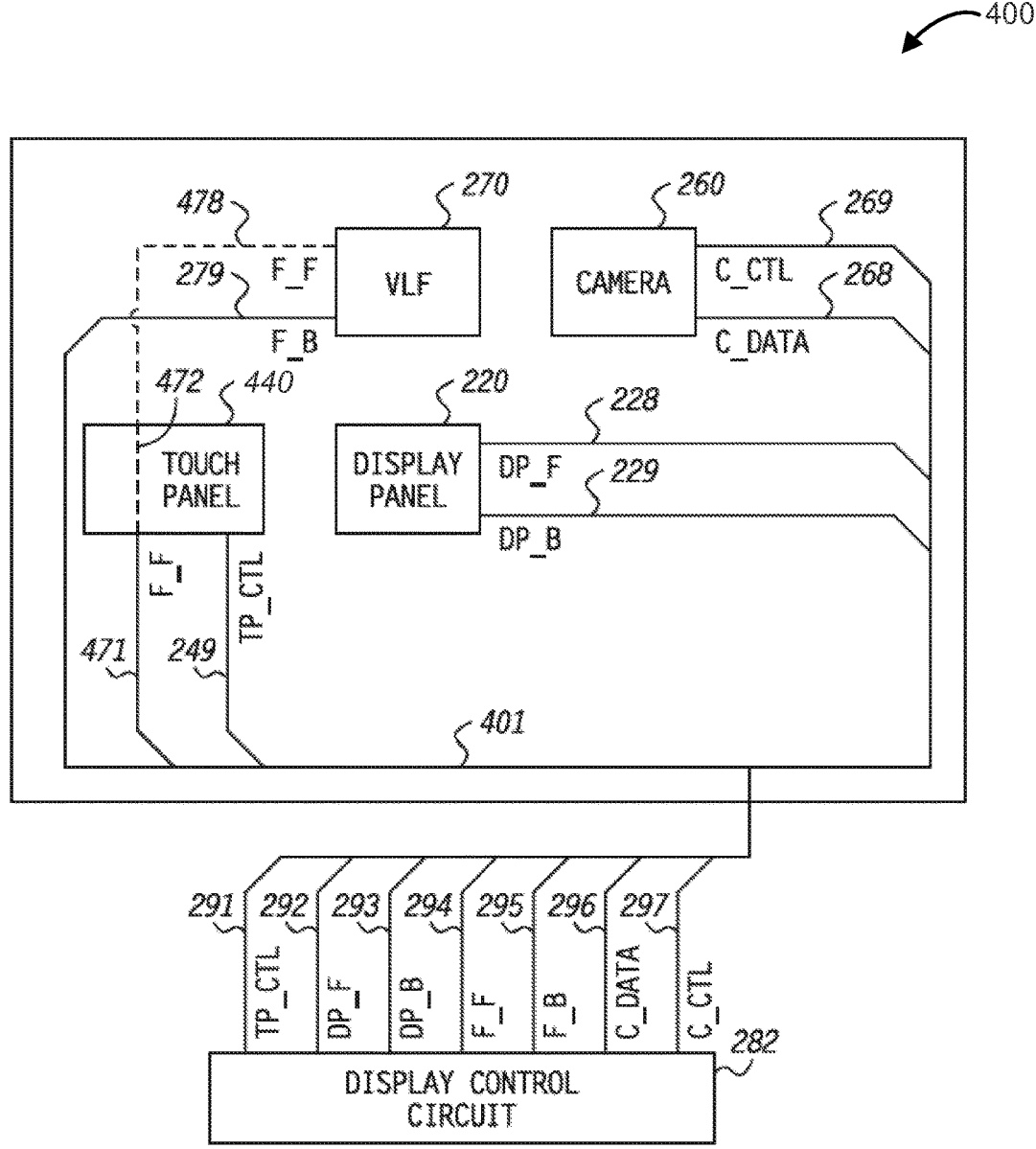
FIG. 5 illustrates a block diagram a particular embodiment of portion of FIG. 2 in accordance with a particular embodiment.

FIG. 5 illustrates in schematic form an information processing system that is a particular embodiment of the information processing system. The information processing system of FIG. 5 includes a display system 400 that is a particular embodiment of the display system 200 of FIG. 3. Features of FIG. 5, including features of the display system 400, having the same reference numbers as features as previously described are presumed to be the same. Though it will be appreciated, that these features may vary.

The display system 400 varies from the display system 200 in that the signal communication path of the signal F_F travels over a different signal communication path. In particular, the communication path of the signal F_F of display system 400 includes signal communication path segments 294, 471, 472, and 478, wherein segments 472 and 478 are dashed to indicate that they are portions of the touch panel 440. Thus, the signal communication path segments of display system 400 over which signal F_F is transmitted include: segment 294 as previously described; segment 471 that connects segment 294 to a first location of the touch panel 440; segment 472, which is a part of the touch panel 440 that transmits the signal F_F across the touch panel 440 in route to the visible light filter 270; and segment 478 that is analogous to both the front side bias layer 273 of the VLF 270, and to the interconnect 278 that is connected to the front side bias layer 273 as illustrated at FIG. 2 as will be better understood in reference to FIG. 6. It will be appreciated that routing of segments 472 and 478 of the visible light filter 270 at the touch panel 440 can reduce the amount of interconnect segments that need to be implemented at an interconnect specific feature. For example, a dedicated interconnect, such as a wire of a ribbon cable, is no longer needed to connect segment 294 to segment 278.

Figure 6:
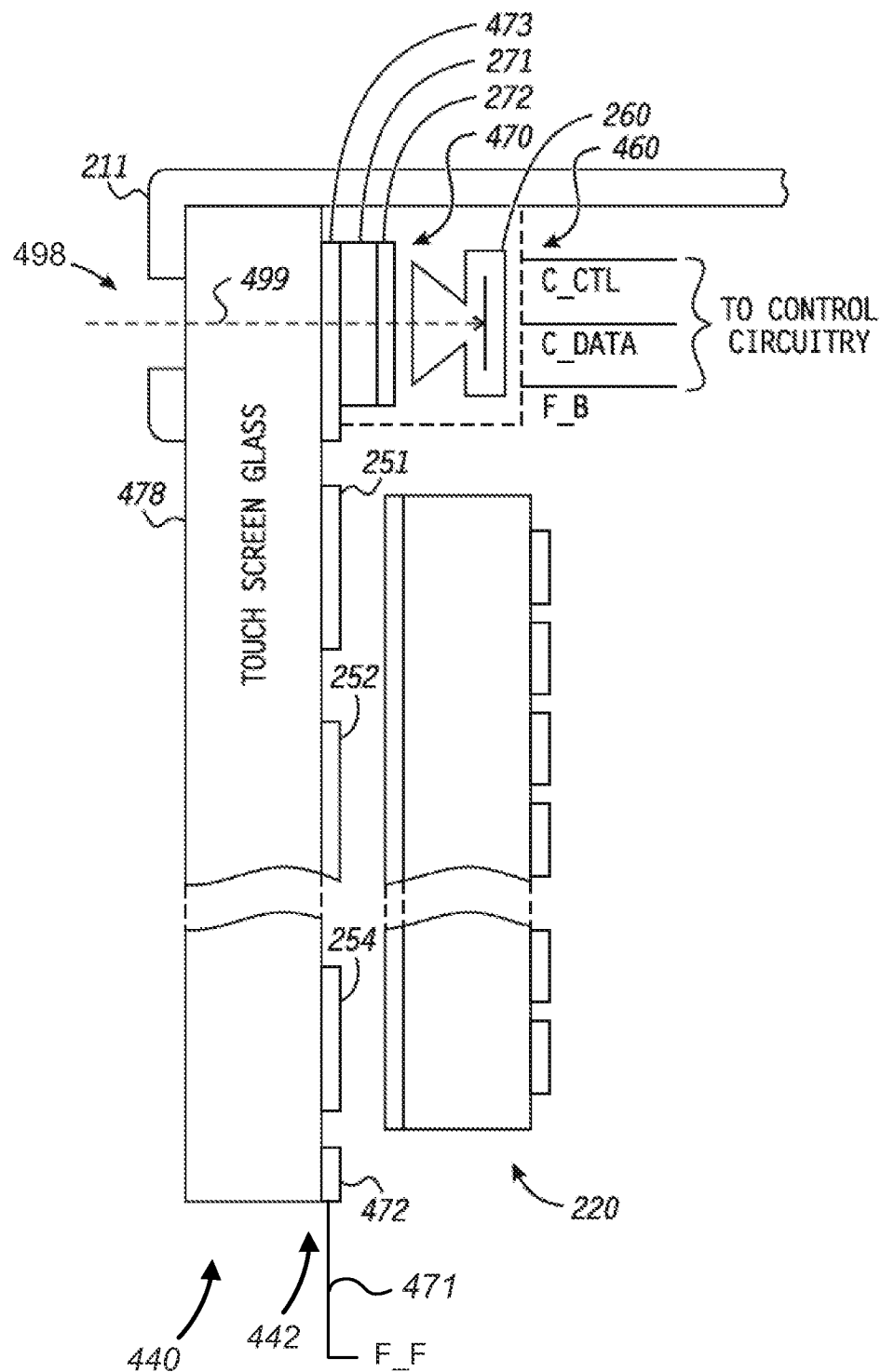
FIG. 6 illustrates a cross-sectional view of a portion of FIG. 5 in accordance with a particular embodiment.

FIG. 6 illustrates, in side view, an embodiment of a portion of display system 400 that communicates signal F_F to the touch panel 440 via an interconnect that includes conductive region 471, wherein the VLF 470 is integrated at the touch panel 440. Features of the display system 400 having the same reference numbers as features as previously described are presumed to be the same. Though it will be appreciated, that these features may vary from those features of display system 400.

The visible light filter 470 is integrated at the display panel 440 by virtue of having its front-side bias layer 473 reside at the transparent conductive layer 442 of the touch panel. Therefore, the bias layer 473 and the transparent touch grid, which includes features 251, 252 and 254, and the interconnect 471 can be made from the same material. It will be appreciated that the features 473, 472, 251, 252, and 254 can be formed simultaneously during a common process. For example, a conformal layer of a transparent conductor can be etched simultaneously to form these features. Integrating a variable light filter onto the touch panel 440 in this manner can result in a higher degree of integration. Alternatively, the interconnect 472 can be formed from a non-transparent conductive layer, so long its location does not obstruct the display field in an undesirable manner.

Figure 7:
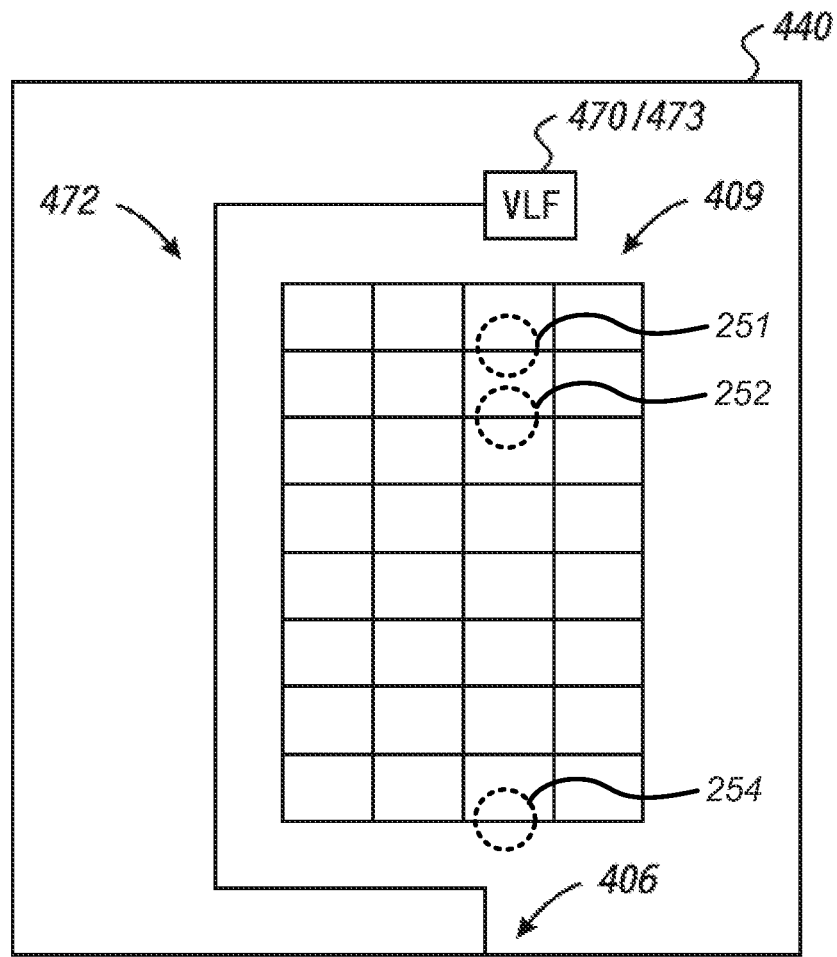
FIG. 7 illustrates an overhead view of a portion of FIG. 5 in accordance with a particular embodiment.

FIG. 7 illustrates an overhead view of touch panel 440, including the location of the visible light filter 470, and transparent conductive regions 473, 251-252, and 254. The location of the visible light filter 470 also corresponds to the location of conductive region 473, as previously described.

A location 406 represents the location where interconnect 472 connects to interconnect 471 (FIG. 5)) connects conductive region 472.

Figure 8:
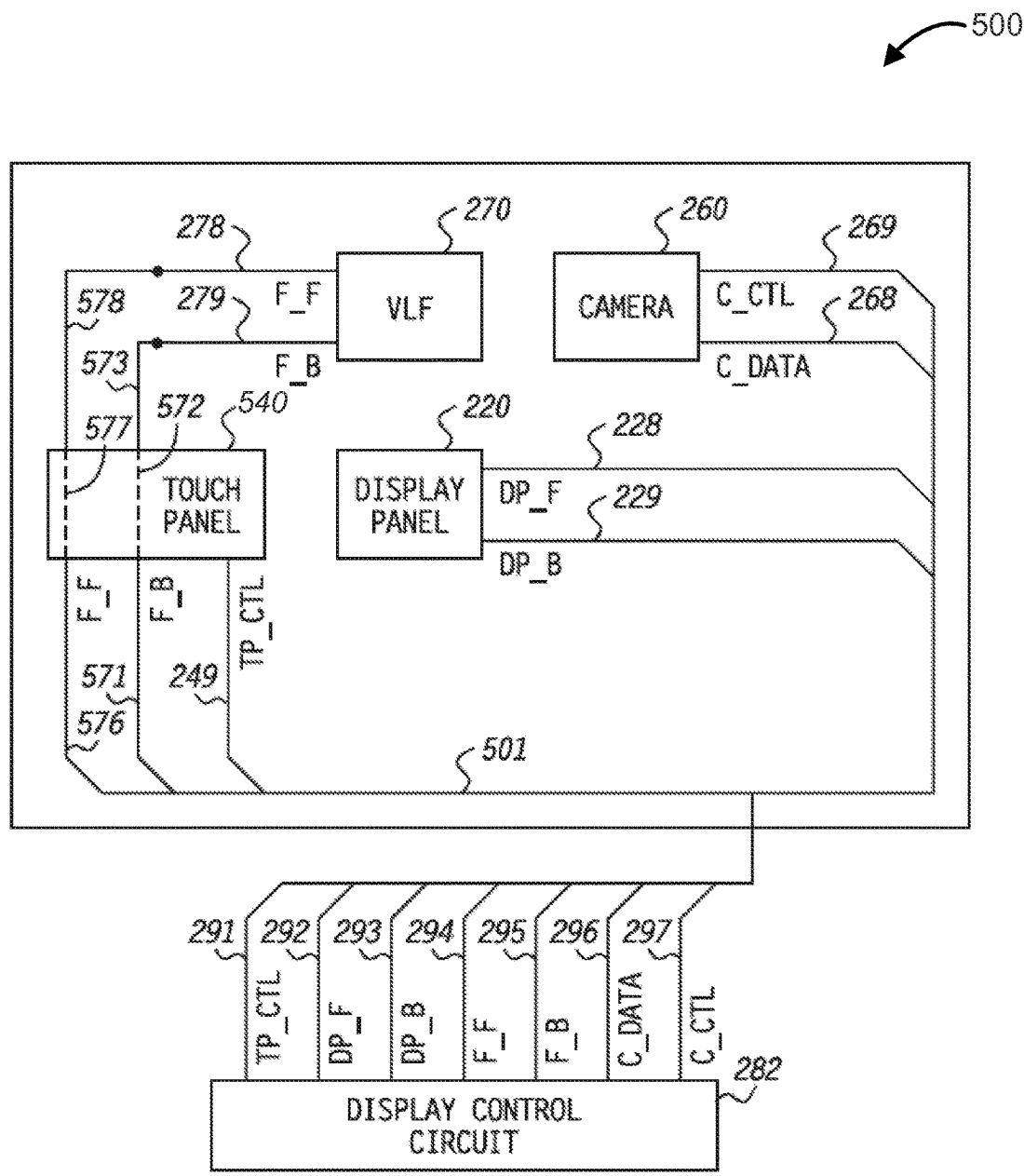
FIG. 8 illustrates a block diagram of a portion of FIG. 7 in accordance with a particular embodiment.

FIG. 8 illustrates in schematic form an information processing system that is a particular embodiment of the display system of FIG. 2. The information processing system of FIG. 8 includes a display system 500 that is a particular embodiment of the display system 200 of FIG. 3. Features of FIG. 8, including features of the display system 500, having the same reference numbers as features as previously described are presumed to be the same. Though it will be appreciated, that these features may vary in addition to those features of display system 500 that are described as being different.

The display system 500 varies from the display system 400 in that the signal communication paths of the both the signal F_F and of the signal F_B have signal communication paths that include portions of the touch panel 540. In particular, segments 294, 576, 577, 578 and 278 form the signal communication path for signal F_F. Segments 295, 571, 572, 573 and 279 form the signal communication path for signal F_B.

Figure 9:
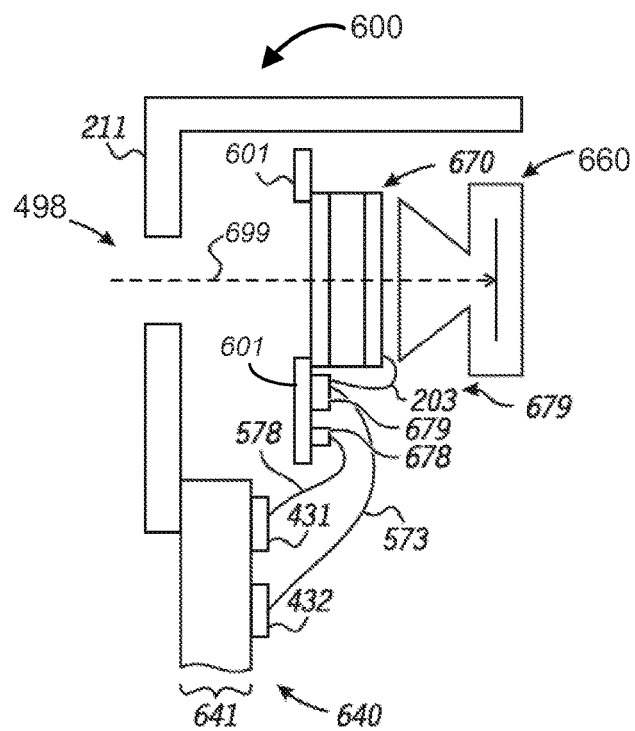
FIG. 9 illustrates a cross-sectional view of a portion of FIG. 7 in accordance with a particular embodiment.

FIG. 9 illustrates an embodiment of a side view of a portion of the display system 500 that communicates signals F_F and F_B from the touch panel 640 via segments 573, 578, and 679, respectively. In FIG. 9, segments 573, 578 and 679 are illustrated to be wire portions of interconnects 278 and 279 (FIG. 2), respectively, that connect to terminals at a circuit board 601 of the visible light filter 670.

Figure 10:
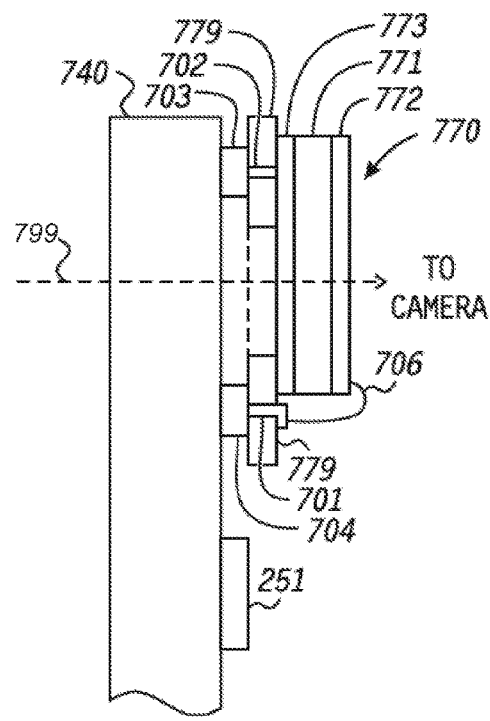
FIG. 10 illustrates a cross-sectional view of a in accordance with a particular embodiment.

In an alternate embodiment, illustrated at FIG. 10, the VLF 770 includes a circuit board 779 at which the VLF filter portion 771 and bias regions 772 and 773 are mounted. The circuit board 779 includes through-substrate vias 701 and 702 that extend from the bottom to the top of the circuit board 779 to allow the circuit board 779 to be directly attached to the touch panel 740 with vias 701 and 702 in electrical contact with the conductive regions 703 and 704. For example, the substrate of the touch panel 749 can extend past the opening 498 to be in the light transmission path 799, and the circuit board 779 can be attached to the touch panel 740 to contact conductive regions 703 and 704, to allow transmission of the signal F_F and F_B respectively. The circuit board 779 is illustrated to have an opening that allows the front surface of the visible light filter 770 to be exposed to the light transmission path 699.

In the preceding discussion, the VLF has been described as preferentially filtering visible light as compared to near-field IR light. According to an embodiment, the absolute change of visible light transmittance as compared to NFIR light transmittance when the VLF is enabled is at least twice as much. According to another embodiment, the absolute change of visible light transmittance as compared to NFIR light transmittance when the VLF is enabled is at least ten times as much. According to an embodiment, the absolute change of visible light transmittance as compared to NFIR light transmittance when the VLF is enabled is at least twenty times as much.

It will be appreciated that while the VLF filter has been described herein as preferentially filtering visible light as opposed to near-field infrared light, in another embodiment, the VLF filter can also preferentially filter far-field infrared light in a similar manner as visible light is filtered relative to near-field infrared light. Thus, a change in VLF operation from a disabled state to an enabled state can also result in a greater absolute change in the far-field infrared light transmittance of the VLF as compared to NFIR light. Thus, the VLF can act as a band-pass filter that also filters out infrared light beyond the near-field infrared range. For example, the absolute change of infrared light transmittance beyond the NFIR wavelength as compared to NFIR light transmittance when the VLF is enabled can be at least twice as much, at least ten times as much, or at least twenty times as much.

According to an embodiment, an application determines that an identity of a user is to be determined and enables a visible light filter associated with a camera of a display system is to reduce its visible light transmittance by a greater amount than its near-field infrared transmittance. Next, the camera captures image information, such of the iris of the user, while the visible light transmittance is reduced. This information is further processed by the information handling system to verify the identity of the user. Once the identity of the user is confirmed, the application can cause the visible light filter to be disabled, wherein the transmittance of the visible light filter is returned to its original state.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description. Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A display system comprising:
a housing comprising a back cover;
a display panel attached to the housing;
an image capture device attached to the housing, the image capture device comprising an image sensor to detect received light of an image; and
a visible light filter attached to the housing to preferentially filter visible light provided to the image capture device as compared to near-field infrared light, wherein, in response to receiving an enabled filter signal at a first input the visible light transmittance of the visible light filter is to be reduced at least twice as much as a near-field infrared transmittance.

2. The device of claim 1, comprising:
a touch sensitive input device, wherein the display panel is disposed between the touch sensitive input device and the back cover.

3. The device of claim 2, further comprises:
a first signal communication path connected to the first input of the visible light filter that comprises a first conductive portion of the touch panel.

4. The device of claim 3, further comprises an image transmission path that includes a first portion through the visible light filter and a second portion through the touch sensitive input device.

5. The device of claim 3, further comprises a second signal communication path connected to a second input of the visible light filter including a second conductive portion of the touch panel.

6. The device of claim 3, wherein the touch sensitive input device comprises a conductive layer along a plane substantially parallel to a front-most major surface of the touch sensitive device, the conductive layer including a second conductive portion to detect a touch at the touch sensitive input device.

7. The device of claim 6, wherein the first and second conductive portions are transparent conductors.

8. The device of claim 1, wherein a signal communication path connected to the first input of the visible light filter comprises a conductive portion of the display panel.

9. The device of claim 8, wherein the signal communication path is a transparent conductor.

10. The device of claim 1, wherein a signal communication path of the display system that is connected to the first input of the visible light filter comprises a transparent conductor.

11. The device of claim 1, further comprising:
a touch sensitive input device, wherein the display panel is disposed between the touch sensitive input device and the back cover;
the visible light filter further comprises:
 a first bias layer coupled to the first input, and
 a second bias layer coupled to a second, input and is spaced apart from the first bias layer, the visible light filter to have different voltage differential between the first and second bias layers when enabled than when disabled;
a control circuit comprising a first output and a second output;
a first signal communication path from the first output of the control circuit to the first input of the visible light filter; and
a second signal communication path from the second output of the control circuit to the second input of the visible light filter, wherein only one of the first control signal path and the second signal path have a conductive portion at the display panel.

12. A method comprising:
receiving a first control information at a visible light filter integrated with a display panel at a common housing;
setting the visible light filter to a first transmittance based upon the first control information, the first transmittance comprising a first near-field infrared light transmittance and a first visible light transmittance;
receiving a second control information at the visible light filter;
setting the visible light filter to a second transmittance based upon the second control information, the second transmittance comprising a second near-field infrared light transmittance and a second visible light transmittance, in response to receiving the second control information the visible light transmittance of the visible light filter is reduced at least twice as much as the near-field infrared transmittance.

13. The method of claim 12, wherein receiving the first control information includes receiving the first control information via a transparent conductor.

14. The method of claim 12, wherein receiving the first control information includes receiving the first control information via a transparent conductor disposed at a touch sensitive module integrated at the common housing.

15. The method of claim 12, further comprising:
in response to initiating a user identity determination, providing the second control information.

16. The method of claim 15, further comprising:
in response to determining an identity of the user, receiving the first control information at the visible light filter to return the visible light filter to the first transmittance.

17. The method of claim 16, further comprising determining the identity of the user based upon an image of the user's iris obtained while the visible light filter had the second transmittance.

18. A system comprising:
a display housing comprising a back cover;
a touch sensitive input device comprising a plurality of transparent conductor regions, including first transparent conductor region;
a display panel attached to the housing, wherein the display panel is disposed between the touch sensitive input device and the back cover;
an image capture device attached to the housing, the image capture device comprising an image sensor to detect received light of an image; and
a visible light filter attached to the housing to preferentially filter visible light as compared to near-field infrared light, an input of the visible light filter connected to a signal communication path that includes the first transparent conductor region, wherein in response to receiving an enabled filter signal at the input, the visible light transmittance of the visible light filter is to be reduced at least twice as much as the near-field infrared transmittance.

19. The system of claim 18, further comprising a data processor executing code that causes the enabled filter signal to be communicated to the visible light filter as part of an operation confirming an identity of a user.

20. The system of claim 18, further comprising a data processor executing code that causes the enabled filter signal to be communicated to the visible light filter as part of an operation to receive an image of a user's iris, and to confirm an identity of the user based upon the image.

* * * * *